US011052317B1

(12) United States Patent
Imamura et al.

(10) Patent No.: US 11,052,317 B1
(45) Date of Patent: Jul. 6, 2021

(54) PERFORMING SIMULATION OF STRETCHABLE CHARACTER IN COMPUTER GAME

(71) Applicant: Square Enix Ltd., London (GB)

(72) Inventors: Noriyuki Imamura, Redwood City, CA (US); Andrew Reeves, Clermont, FL (US); Gary Linn Snethen, Fremont, CA (US)

(73) Assignee: SQUARE ENIX LTD., London (GB)

( * ) Notice: Subject to any disclaimer, the term of this patent is extended or adjusted under 35 U.S.C. 154(b) by 0 days.

(21) Appl. No.: 16/915,732

(22) Filed: Jun. 29, 2020

(51) Int. Cl.
*A63F 13/57* (2014.01)

(52) U.S. Cl.
CPC ...... *A63F 13/57* (2014.09); *A63F 2300/6607* (2013.01)

(58) Field of Classification Search
CPC .......... A63F 13/57; A63F 13/55; A63F 13/56; A63F 2300/64; A63F 2300/65; A63F 2300/66; A63F 2300/6607; A63F 2300/6615; A63F 2300/6623
USPC .......................................................... 463/31
See application file for complete search history.

(56) References Cited

U.S. PATENT DOCUMENTS

| | | | |
|---|---|---|---|
| 6,626,759 B1 * | 9/2003 | Matsuoka | A63F 13/005 463/31 |
| 7,088,366 B2 * | 8/2006 | Okubo | A63F 13/10 345/473 |
| 8,216,066 B2 * | 7/2012 | Tsunashima | A63F 13/10 463/30 |
| 8,696,451 B2 * | 4/2014 | Nimura | A63F 13/5258 463/31 |
| 9,056,247 B2 * | 6/2015 | Glassenberg | A63F 13/52 |
| 9,177,409 B2 * | 11/2015 | Rennuit | G06T 13/40 |
| 2011/0267356 A1 * | 11/2011 | Rennuit | A63F 13/52 345/473 |

FOREIGN PATENT DOCUMENTS

| | | | |
|---|---|---|---|
| JP | 3530095 B2 | 5/2004 | |
| JP | 3568861 B2 | 9/2004 | |

OTHER PUBLICATIONS

Gregory, J., "Chapter 12.3: Poses," Game Engine Architecture, CRC Press, Jul. 20, 2018, pp. 729-734.

* cited by examiner

*Primary Examiner* — Allen Chan
(74) *Attorney, Agent, or Firm* — Fenwick & West LLP (57) ABSTRACT

Embodiments relate to generating a character with a stretchable body part in a computer game. A pose of a body part of the character is received. The body part includes at least one base joint, bones connected via the at least one base joint, and an end effector coupled to one of the bones. An end effector position is received. The end effector position is where an end effector of the body part is to be placed in an updated pose. Inverse kinematics operations are performed to determine the updated pose of the body part by at least changing a length of one of the bones to place the end effector at the end effector position responsive to receiving the pose of the body part and the end effector position.

20 Claims, 8 Drawing Sheets

PERFORMING SIMULATION OF STRETCHABLE CHARACTER IN COMPUTER GAME

BACKGROUND

The present disclosure relates to simulating a character having a stretchable body part in a computer game.

Many video games include characters that interact with environment upon which the video game takes place. Various schemes are adopted to render the characters in the video game more realistic and in real-time. A character is generally defined by a skeleton including bones that are connected by articulate joints arranged in a tree data structure. Inverse kinematics is performed using such skeleton to generate a series of poses of characters so that the limbs of characters align with the virtual environment of the video game. Each of the pose may be defined in terms of properties of joints, for example, including translational movements and rotational movements of the joints. Depending on the action to be taken by each character, inverse kinematics determines the orientations of joints so that a series of poses may transition in a smooth and realistic manner. The poses of the character may then be processed into a set of polygons with vertices that form a surface of the character.

SUMMARY

Embodiments relate to producing a character with a stretchable body part in a computer game. A pose of a body part of the character and an end effector position are received. The body part includes at least one base joint, bones connected via the at least one base joint, and an end effector coupled to one or more of the bones. The end effector position is where an end effector of the body part is to be placed in an updated pose. An inverse kinematics operation is performed to determine the updated pose of the body part by at least changing a length of one of the bones so that the end effector is placed at the received end effector position. Polygon information of the body part is generated based on the updated pose for displaying a frame including the character.

In one or more embodiments, properties of a plurality of first virtual joints are determined by performing interpolation joint information of two or more base joints. The first virtual joints are children joints of the at least one base joint.

In one or more embodiments, properties of a plurality of second virtual joints are determined. The second virtual joints are children joints of the first virtual joints by performing forward kinematic operations on the first virtual joints using the pose of the body part. Polygons representing at least a portion of a surface of the body part are bound to the second virtual joints.

In one or more embodiments, the relationships between a subset of the second joints and associated first virtual joints are defined by offset vectors.

In one or more embodiments, character movement information for the character is received. Forward kinematics operations as constrained by the character movement information are performed to generate at least the pose of the body part and the end effector position.

In one or more embodiments, an enablement signal indicating enabling of the changing of the length of one of the bones is received.

In one or more embodiments, the updated pose indicates at least a translational movement and a rotational movement of each of the bones in a matrix form.

In one or more embodiments, translational movements of two or more of the bones are changed by the inverse kinematics operation.

In one or more embodiments, performing the inverse kinematics operation involves rotating a first bone relative to a first joint to move a second bone and a second joint between the first bone and the second bone so that the end effector is placed on a straight line between the first joint and the end effector position; and extending or contracting the first bone and extending or contracting the second bone so that a distance between the second joint and the straight line satisfies a predetermined condition and the end effector is placed at the end effector position.

The figures depict various embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digit or digits of each reference number correspond to the figure in which the reference number is first used.

Embodiments relate to generating graphical representations of a character with one or more stretchable body parts in a computer game that involves performing inverse kinematics operations where one or more bones in the body parts are stretched or contracted according to the pose of the character. The inverse kinematics operations are performed based on an end effector position of a stretchable body parts and the current pose of the character to determine properties (e.g., translational movements of joints and rotational movements of joints) of base joints coupled to one or more bones. After the properties of the base joints are determined, properties of first virtual joints are determined by interpolating the properties of the based joints. Then, forward kinematics operations are performed on the first virtual joints to obtain second virtual joints that represent an updated pose of the character. Positions and configurations of polygons representing the surface of the stretchable body parts are determined so that the polygons are bound to the second virtual joints.

Among other advantages, embodiments enable efficient generation of moving graphical representations of a character with one or more stretchable body parts that move in a manner as desired by a game developer. Further, embodiments may reuse most of the algorithm or code for performing forward kinematics operations and inverse kinematics operations on characters with fixed length bones, reducing the time associated with developing or updating the algorithm or code to produce characters with stretchable body parts as well as reducing the complexity of code for determining the pose of the character.

Figure 1:
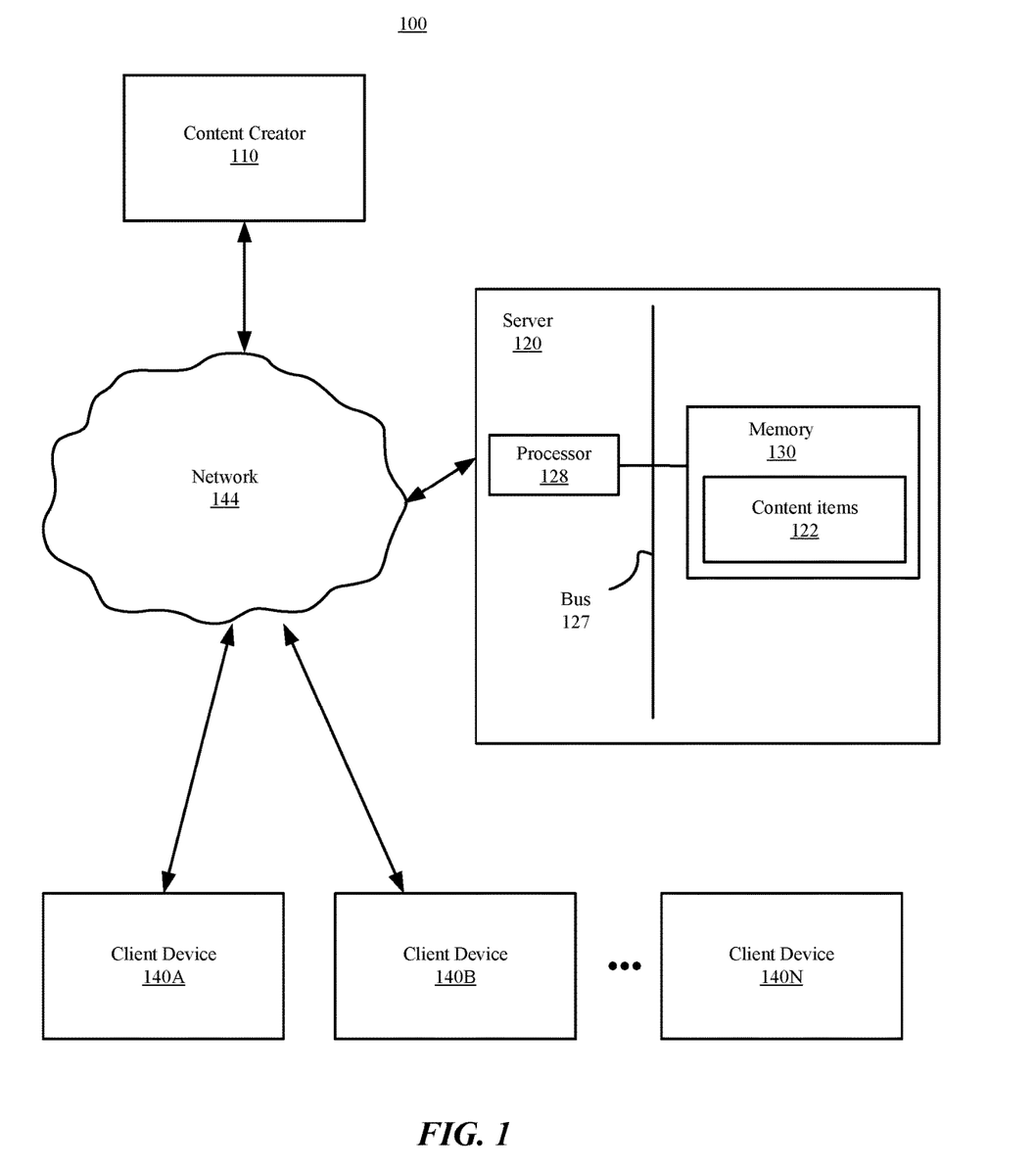
FIG. 1 is a block diagram of a computer game system, according to an embodiment.

FIG. 1 is a block diagram of a system 100 in which the techniques described herein may be practiced, according to an embodiment. The system 100 includes, among other components, a content creator 110, a server 120, client devices 140, and a network 144. In other embodiments, the system 100 may include additional content creators 110 or servers 120, or may include a singular client device 140.

The content creator 110, the server 120, and the client devices 140 are configured to communicate via the network 144. The network 144 includes any combination of local area and/or wide area networks, using both wired and/or wireless communication systems. In one embodiment, the network 144 uses standard communications technologies and/or protocols. For example, the network 144 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 144 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 144 may be represented using any suitable format, such as hypertext markup language (HTML) or extensible markup language (XML). In some embodiments, all or some of the communication links of the network 144 may be encrypted using any suitable technique or techniques.

The content creator 110 is a computing device, such as a personal computer, a mobile phone, a tablet, or so on, which enables a game developer to create content items (e.g., characters and environment information) for a computer game. For this purpose, the content creator 110 includes a processor and a memory (not shown) that stores various software modules for creating content items. The created content items are sent to the server 120 for storing on its memory 130.

The server 120 is a computing device that includes a processor 128 and a memory 130 connected by a bus 127.

The memory 130 includes various executable code modules or non-executable content items 122. The server 120 may receive and route messages between the content creator 110 and the client devices 140. The non-executable content items 122 may include information on characters with stretchable body parts. Such content items may be sent to the client devices 140 via the network 144.

The processor 128 is capable of executing instructions, sequential or otherwise, that specify operations to be taken, such as performance of some or all of the techniques described herein. The bus 127 connects the processor 128 to the memory 130, enabling data transfer from the one to the other and vice versa. Depending upon the embodiments, the server 120 may include additional elements conventional to computing devices.

Each client device 140 is a computing device that includes a game or other software. The client device 140 receives data objects from the server 120 and uses the data objects to render graphical representations of characters and environment in which the characters take actions in the game. Different client devices 140 can request different data objects from the server 120.

Although the embodiment of FIG. 1 is described as operating in a networked environment, in other embodiments, the client devices 140 are not connected via network and the computer game is executed without exchanging messages or content items over any network. In such cases, any content items associated with the compute game may be received and installed on the client devices 140 using a non-transitory computer readable medium such as DVD ROM, CD ROM or flash drive.

Figure 2:
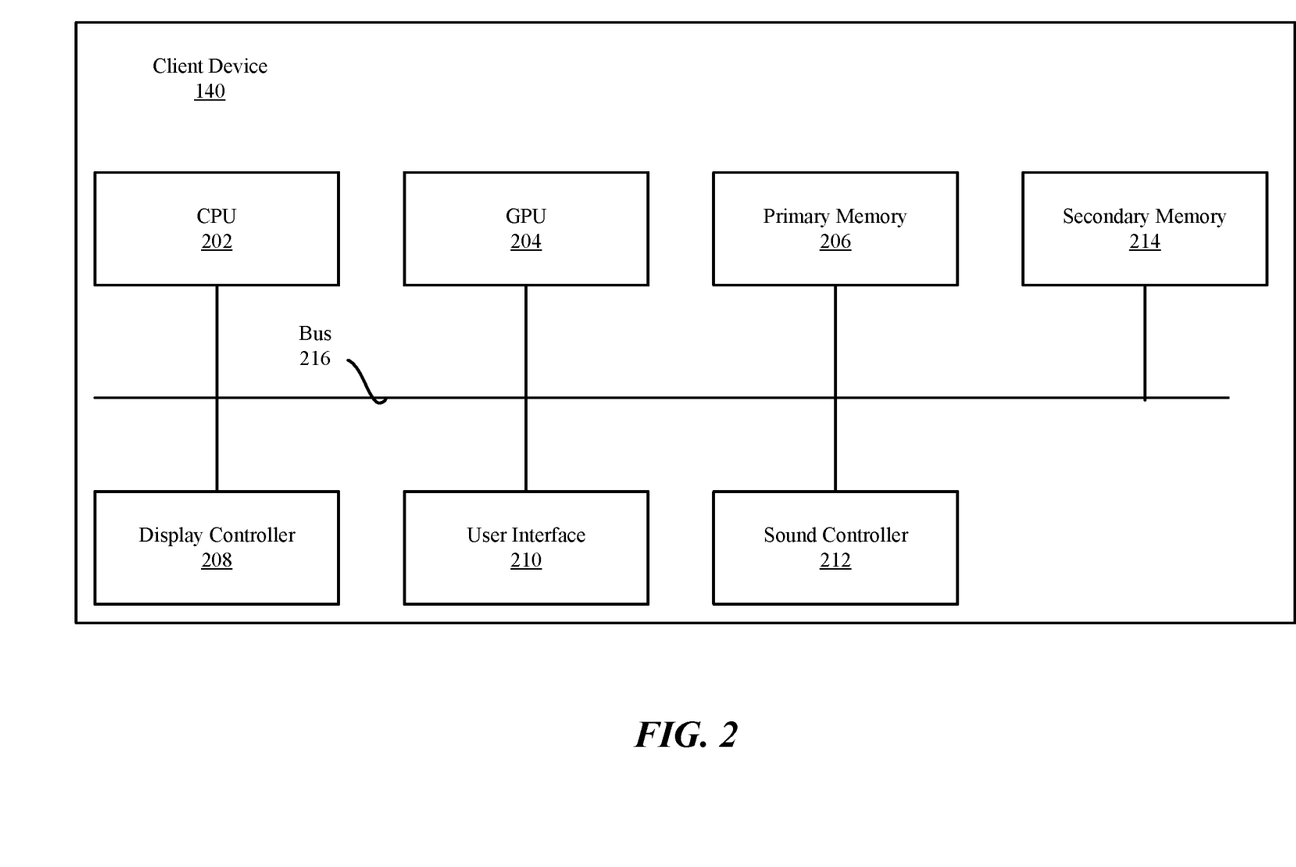
FIG. 2 is a block diagram of the client device of FIG. 1, according to an embodiment.

FIG. 2 is a block diagram of the client device 140 of FIG. 1, according to an embodiment. Depending upon the embodiment, the content creator 110 and/or server 120 may be embodied as a computing device that includes some or all of the hardware and/or software elements of the client device 140 described herein. The client device 140, content creator 110, and/or server 120 are any machine capable of executing instructions, and may each be a standalone device or a connected (e.g. networked) set of devices.

The client device 140 may include, among other components, a central processing unit ("CPU") 202, a graphics processing unit ("GPU") 204, a primary memory 206, a secondary memory 214, a display controller 208, a user interface 210, and a sound controller 212 that are connected by a bus 216. While only a single client device 140 is illustrated, other embodiments may include any collection of client devices 140 that individually or jointly execute instructions to perform any one or more of the methodologies discussed herein.

The primary memory 206 is a machine-readable medium that stores instructions (e.g., software) embodying any one or more of the methodologies or functions described herein. For example, the primary memory 206 may store instructions that, when executed by the CPU 202, configure the CPU 202 to perform a process 700, described below in detail with reference to FIG. 7. Instructions may also reside, partially or completely, within the CPU 202 and/or GPU 204, e.g., within cache memory, during execution of the instructions.

The term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the device and that cause the device to perform any one or more of the methodologies disclosed herein. The term "machine-readable medium" includes, but is not limited to, data repositories in the form of solid-state memories, optical media, and magnetic media.

The secondary memory 214 is a memory separate from the primary memory 206. Similar to the primary memory 206, the secondary memory 214 is a machine-readable medium that stores instructions (e.g., software) embodying any one or more of the methodologies or functions described herein. For example, the primary memory 206 may be a hard drive of the client device 140, and the secondary memory 214 may be a game disc.

The CPU 202 is processing circuitry configured to carry out the instructions stored in the primary memory 206 and/or secondary memory 214. The CPU 202 may be a general-purpose or embedded processor using any of a variety of instruction set architectures (ISAs). Although a single CPU is illustrated in FIG. 2, the client device 140 may include multiple CPUs 202. In multiprocessor systems, each of the CPUs 202 may commonly, but not necessarily, implement the same ISA.

The GPU 204 is a processing circuit specifically designed for efficient processing of graphical images. The GPU 204 may render objects to be displayed into a frame buffer (e.g., one that includes pixel data for an entire frame) based on instructions from the CPU 202. The GPU 204 may include one or more graphics processors that may execute graphics software to perform a part or all of the graphics operations.

The display controller 208 is a circuit that generates a video signal using graphical data from the GPU 204. For example, the display controller 208 drives a display device (e.g., a liquid crystal display (LCD) and a projector). As such, a game, including one or more characters with stretchable body parts, can be displayed as images or a sequence of image frames through the display controller 208.

The sound controller 212 is a circuit that provides input and output of audio signals to and from the client device 140. For purposes of a character, the sound controller 212 can provide audio signals that align with actions and objects in the computer game.

The user interface 210 is hardware, software, firmware, or a combination thereof that enables a user to interact with the client device 140. The user interface 210 can include an alphanumeric input device (e.g., a keyboard) and a cursor control device (e.g., a mouse, a trackball, a joystick, a motion sensor, or other pointing instrument). For example, a user uses a keyboard and mouse to control a character's action within a game environment that includes an electronic map rendered by the client device 140.

The client device 140 executes computer program modules for providing functionality described herein. As used herein, the term "module" refers to computer program instructions and/or other logic used to provide the specified functionality. Thus, a module can be implemented in hardware, firmware, and/or software. In some embodiments, program modules formed of executable computer program instructions are loaded into the memory 206, and executed by the CPU 202 or the GPU 204. For example, program instructions for the process 700 describe herein can be loaded into the primary memory 206 and/or secondary memory 214, and executed by the CPU 202 and GPU 204. In some embodiment, one or more of the functionality of the modules described herein may be performed by dedicated circuitry.

Figure 3:
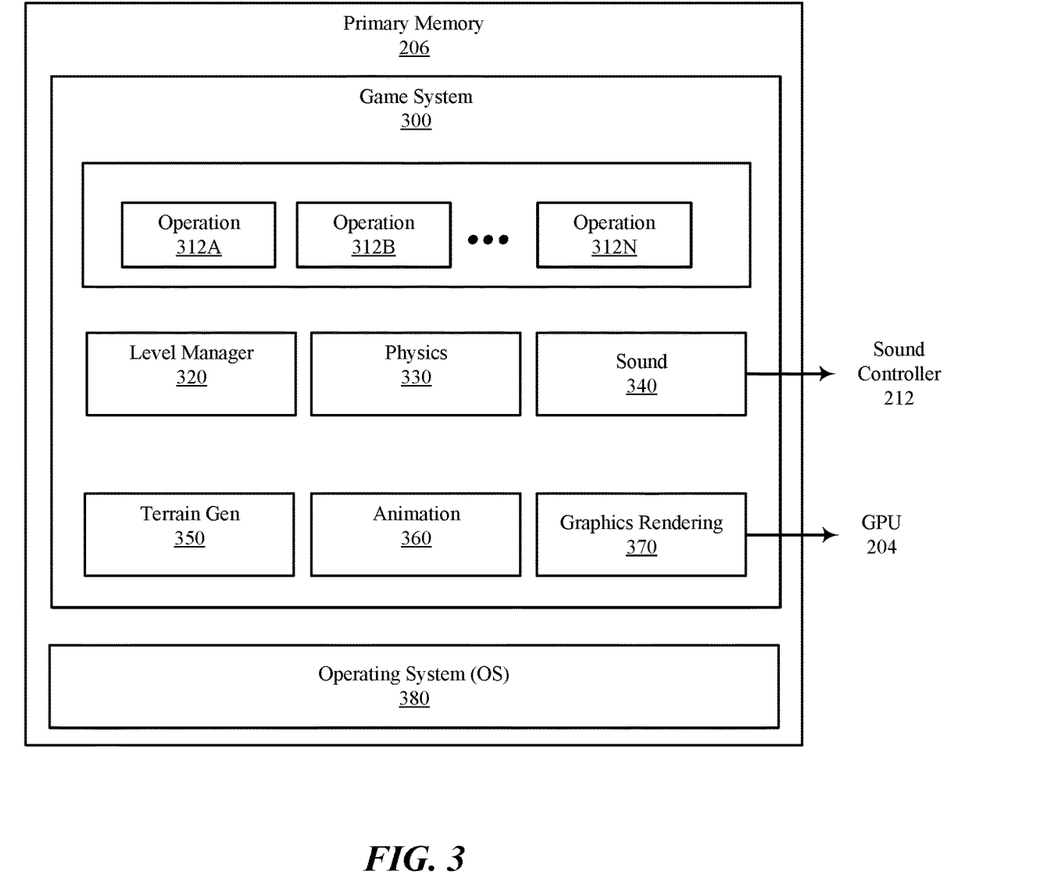
FIG. 3 is a block diagram of software modules in a memory of the client device of FIG. 1, according to an embodiment.

FIG. 3 is a block diagram of software modules in a primary memory of the client device 140 of FIG. 1, according to an embodiment. In particular, FIG. 3 illustrates software modules in the primary memory 206 of the client device 140. The primary memory 206 may store, among other modules, a game system 300 and an operating system ("OS") 380. The primary memory 206 may include other modules not illustrated in FIG. 3. Furthermore, in other embodiments, at least part of the modules in FIG. 3 is stored in secondary memory 214.

The game system 300 includes a level manager 320, a physics system 330, a sound module 340, a terrain generator 350, an animation module 360, and a graphics rendering module 370. These modules collectively form a "game engine" of the game system 300.

The game system 300 performs operations 312A through 312N (collectively referred to as "operations 312") to generate actions of characters within game environment. Specifically, the game system 300 performs these operations 312 that involves changes in poses of characters to realize actions. The operations 312 refer to computing operations that result in changes in various parameters (e.g., poses or positions s of a character) based upon certain events (e.g., user interactions, expirations of time, and triggers occurring in the game) occur.

Some operations 312 are associated with actions taken by a character with a stretchable body parts. Such character may involve one or more body parts that stretchable or contractable (e.g., elastic). The character may appear to have flexible bones that stretch or contract as the character takes actions (e.g., stretch arm to punch an opponent) or as the character becomes a subject of actions by other characters (e.g., receiving punch from an opponent).

The level manager 320 receives data objects from the server 120 and stores the level data in the primary memory 206. Other modules of the game system 300 can request one or more levels from the level manager 320, which responds to the requests by sending the level data corresponding to the requested level to the module of the game system 300 that sent the request.

The terrain generator 350 generates a complete electronic map based on electronic map data and game data. The terrain generator 350 receives electronic map data from the level manager 320, and game and object data from the content source stored, for example, in secondary memory 214.

The physics system 330 models and simulates the dynamics of objects in the game environment. After an operation 312 is initiated in the game system 300, the physics system 330 models how an action or event of the operation 312 affects the object associated with the operation 312. For example, the physics system models a rock as it rolls down a hill. Depending on the action and object, other objects and actions may become associated with the action or object.

The animation module 360 performs kinematic animation of objects based on the operations 312 from the game system 300. For example, if an operation 312 specifies that a character's arm is to punch another character, the animation module 360 generates a series of poses that collectively form the movement of the character's body that results in the punching action. For this purpose, the animation module 360 is capable of performing forward kinematics operations, inverse kinematics operations, and generation of transformation matrix. Some of these characters may have stretchable body parts with one or more bones that can be stretched or contracted during such operations. The details of the animation module 360 are described below with reference to FIG. 4. Such stretching or contracting of the bones can be represented in terms of translational movements of the joints.

The sound module 340 generates sounds corresponding to events and/or actions occurring in the game environment. For example, a corresponding sound may be generated when a character punches an opponent. Animation data from the animation module 360 or terrain information from the terrain generator 350 may be sent to the sound module 340 to enable the sound module 340 to produce appropriate sound data that is sent to the sound controller 212.

The graphics rendering module 370 renders graphics using information from the animation module 360 to generate an image frame. For this purpose, the graphics rendering module 370 may receive transformation matrices that indicate changes in vertices of polygons that collectively form a surface of the characters, and terrain information from the terrain generator 350. The graphics rendering module 370 processes the transformation matrices and the terrain information to generate graphical data that is sent to the GPU 204 for rendering images on a display screen, e.g. a display screen of the client device 140 or a display connected to the client device 140, via the display controller 208.

The OS 380 manages computer hardware and software resources. Specifically, the OS 380 acts as an intermediary between programs and the computer hardware. For example, the OS 380 can perform basic tasks, such as recognizing input from the user interface 210 and sending output to the display controller 208.

Figure 4:
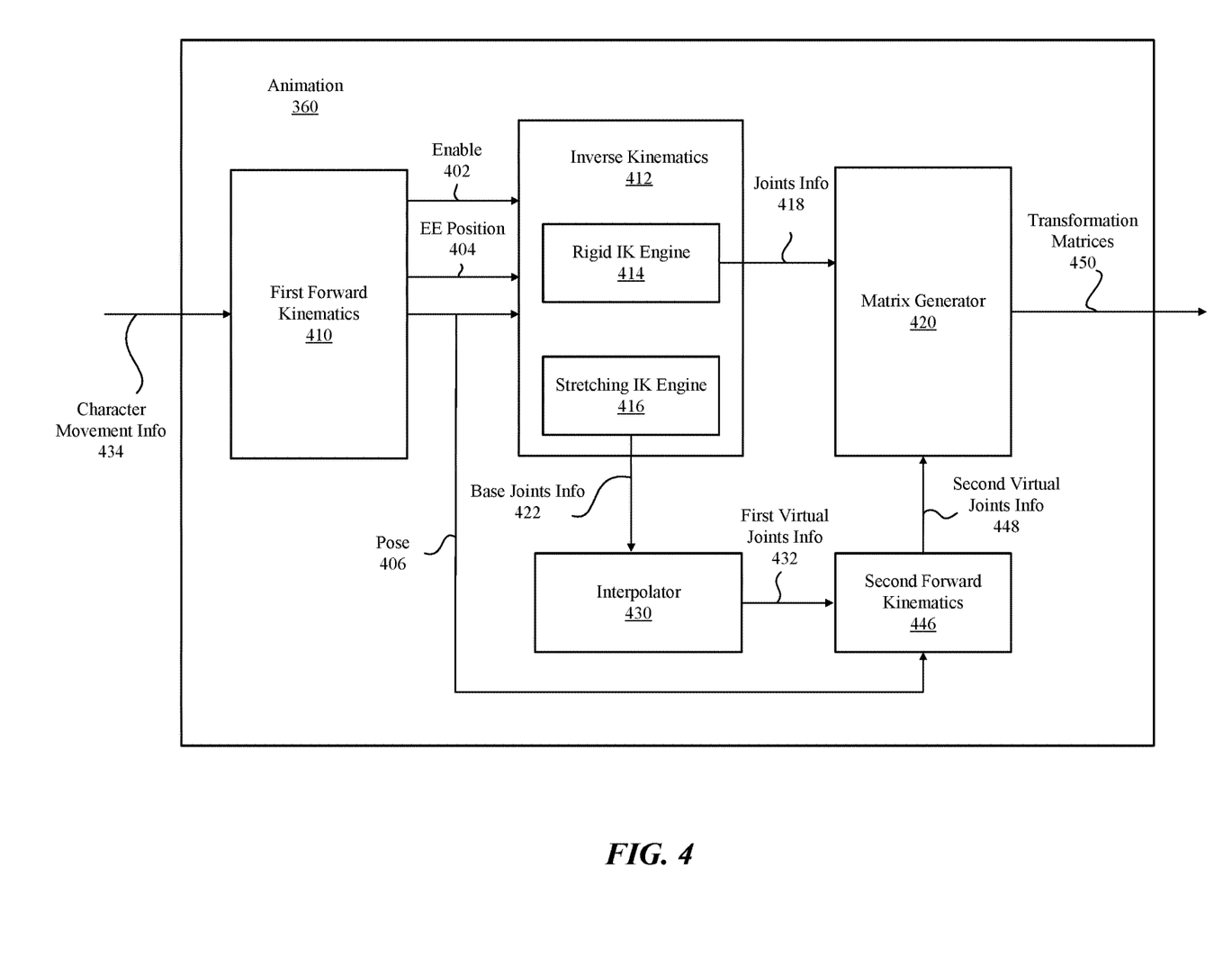
FIG. 4 is a block diagram of an animation module in the memory of FIG. 3, according to an embodiment.

FIG. 4 is a block diagram of the animation module 360 according to one embodiment. The animation module 360 receives character movement information 434, processes character movement information 434 using forward kinematics and inverse kinematics, and generates transformation matrices 450 sent to the graphics rendering module 370. For this purpose, the animation module 360 may include, among other components, first forward kinematics module 410, inverse kinematics module 412, interpolator 430, second forward kinematics module 446, and matrix generator 420.

The first forward kinematics module 410 performs forward kinematics operations of a character as constrained by character movement information 434 associated with the character. As a result, the first forward kinematics module 410 generates end effector positions 404 (e.g., positions of a character's hand or foot), and pose information 406 using, for example, conventional techniques well known in the art. The pose information 406 may indicate properties of the joints (e.g., relative translations and rotations of the joints) as well as the properties of the bones (e.g., the change in the lengths of bones, which may be represented as translational movements of the joints). The first forward kinematics module 410 also generates an enable signal 402 indicating whether any body parts of the character is stretchable. Depending on the enable signal 402, different methods may be used to perform inverse kinematics at the inverse kinematics module 412. The enable signal 402, the pose information 406 and the end effector positions 404 are sent to the inverse kinematics module 412.

Character movement information refers to information indicating constraints or features of poses and movements of a character. Character movement information may be obtained from an animation graph of the character, which functions as a blueprint for actions and poses that can be taken by the character. The character movement information 434 constraints forward kinematic operations performed the first forward kinematics module 410 so that generated poses are in line with the animation graph.

The inverse kinematics module 412 performs inverse kinematics operations on a character based on information received from the first forward kinematics module 410. The inverse kinematics module 412 includes two engines, one is a rigid inverse kinematics (IK) engine 414, and the other is a stretching IK engine 416. The rigid IK engine 414 determines properties of joints in the character (which, collectively, form an updated pose of the character) without any changes in the lengths of bones, using convention techniques well known in the art. The properties of the joints determined by the rigid IK engine 414 are sent to the matrix generator 420 as joints information 418.

On the other hand, the stretching IK engine 416 determines base joints information 422 of the character by changing the lengths of bones in the character's body parts, as described below in detail with reference to FIGS. 6A through 6D. In one or more embodiments, the stretching IK engine 416 may change the lengths of the bones only when an end effector (e.g., hand) of the character cannot reach a desired target by merely rotating the base joints. The base joints information 422 becomes the basis for generating first and second virtual joints information 432, 448. The selection between the use of the rigid IK engine 414 and the stretching IK engine 416 is made based on the enable signal 402.

In one or more embodiments, one or more body parts of the character may be processed by the rigid IK engine 414 while the remaining body parts of the same character are processed by stretching IK engine 416. The conditions or body parts to be processed by either IK engines 414, 416 may be defined by the character movement information.

When the stretching IK engine 416 is used, the interpolator 430 receives the base joints information 422 from the stretching IK engine 416. The base joints information 422 indicates the properties (e.g., translational movements, rotational movements and scales of the base joints) of base joints in a character. The base joints refer to virtual joints that define the overall shape and orientation of body parts that are stretchable or contractable. Vertices of polygons representing the surface of the body part may not be bound to (e.g., retains certain spatial relationships to) the base joints but instead may be bound to second virtual joints. Alternatively or in addition, a subset of polygons may be bound to various combinations of the base joints, the first virtual joints and the second virtual joints.

The interpolator 430 determines the properties of the first virtual joints between two base joints through interpolation of properties of the two based joints (e.g., positions and orientations of the base joints), as described below with reference to FIG. 6C.

The number of first virtual joints between two given base joints may be fixed or may be varied. The first virtual joints are children joints of associated base joints. By using the first virtual joints, more diverse movements of stretchable or contractable body part can be implemented in the computer game. The increase in the number of first virtual joints enables the number of second virtual joints to be increased, which enables the movements of the body part during stretching or contracting can be more tightly controlled as desired by the designer of the computer game.

The second forward kinematics module 446 receives the first virtual joints information 432 and generates second virtual joints information 448 by performing forward kinematics operations. The second virtual joints information 448 indicates the properties (e.g., relative translational movements, rotational movements and scales) of the second virtual joints that are offset from the corresponding first virtual joints according to corresponding offset vectors. The offset vectors are configured so that the stretching or contracting of a body part are performed in a way that is desired by the designer of the computer game. The offset vectors may indicate translations, rotations and scales of the second virtual joints relative to the first virtual joints. The offset vectors may be derived from fragments of animation (also known as animation clip or simply as "animation"), often generated from information provided by an animator. The second virtual joints may function as binding points for vertices of polygons that form the surface of the corresponding body part.

The joints information 418 or the base joints information 422, depending on the used kinematic engine, is sent to the matrix generator 420 that generates transformation matrices 450. The transformation matrices may be skinning matrices that indicate translational and rotational movement of base joints (when rigid IK engine 414 is used) or second virtual joints (when stretching IK engine 416 is used) of the current image relative to those of the prior image frame. The matrix generator 420 generates the transformation matrix, for example, by using a technique described in Jason Gregory et al., "Poses" in *Game Engine Architecture* ($3^{rd}$ ed.), A K Peters/CRC Press, § 12.3 (2018), which is incorporated by reference herein.

Figure 5:
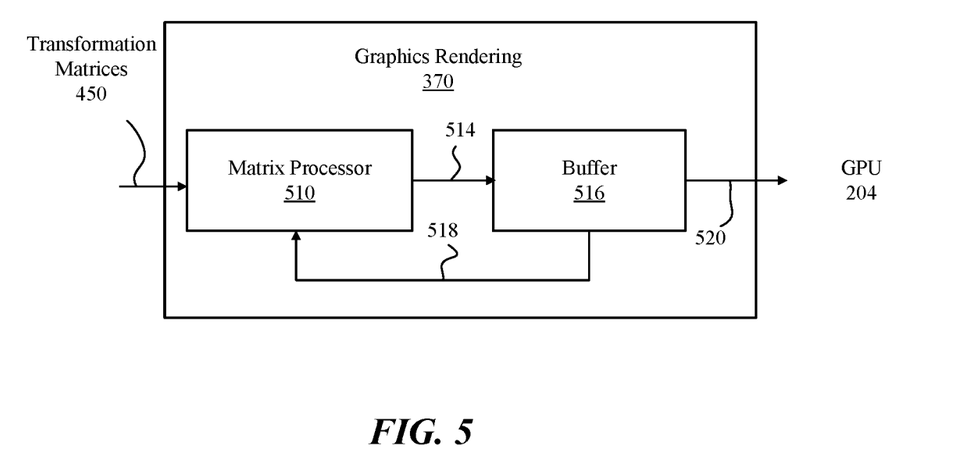
FIG. 5 is a block diagram of a graphics rendering module in the memory of FIG. 3, according to an embodiment.

FIG. 5 is a block diagram of the graphics rendering module 370, according to an embodiment. The graphics rendering module 370 performs operations to determine properties of vertices or polygons constituting surfaces of various objects to be displayed in the computer game. To render the surfaces of the character, the graphics rendering module 370 includes, among other components, a matrix processor 510 and a buffer 516.

The graphics rendering module 370 stores properties of surfaces of the characters, including but not limited to, lists of vertices that form polygons (e.g., triangular meshes) of a surface, a list of normal vectors of the vertices, and a list of polygons in the buffer 516. A subset of such properties 518 is sent to the matrix processor 510 for generating updated properties 514.

The matrix processor 510 receives the transformation matrices 450 and performs matrix operations, among others, on the properties 518 stored in the buffer 516 to generate updated properties 514. The update properties 514 are added to the buffer 516 or replaces corresponding properties in the buffer 516. Graphics data 520 including the properties of the polygons is sent to the GPU 204 to display the character on a screen using techniques that are well known in the art.

An example of inverse kinematics operations performed by the stretching IK engine 416 on a character's arm is described herein with reference to FIGS. 6A through 6D. Although the example is described with respect to the character's arm, the same principle can be applied to other parts of the characters body.

Figure 6A:
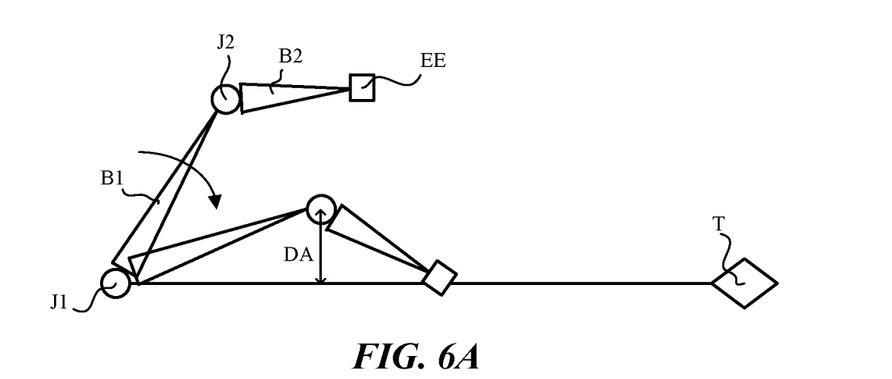
FIG. 6A is a conceptual diagram illustrating rotation of a character's body part about a base joint, according to an embodiment.

FIG. 6A illustrates a skeleton of the character's arm including a shoulder joint J1, an elbow joint J2, an upper arm bone B1, a lower arm bone B2, and a hand EE as an end effector. When an action is to be taken by the arm so that the hand EE reaches target T, the arm is assumed to make a rotational movement with respect to the shoulder joint J1 as shown by arrow in FIG. 6A. By doing so, the hand EE is placed on a line extending between the center of joint J1 and the target T. After the rotation, the joint J2 is separated from the line by distance DA. The elbow joint J2 is a child joint of the shoulder joint J1 for the purpose of forward or inverse kinematics.

Figure 6B:
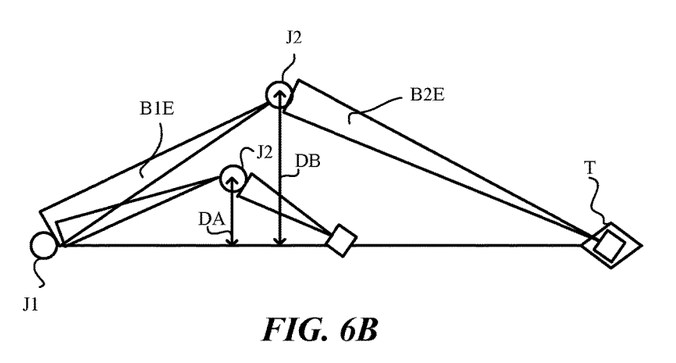
FIG. 6B is a conceptual diagram illustrating stretching of bones in the character's body part, according to an embodiment.

FIG. 6B illustrates a conceptual diagram illustrating adjustment of the lengths of the bones so that the hand EE reaches the target T, according to one embodiment. For example, bone B1 of the arm is extended to B1E and bone B2 is extended to B2E as shown in FIG. 6B, with or without rotations at joints J1, J2. After extending the joints and the hand EE reaching the target T, the distance of joint J2 from the line between the center of the joint J1 and the target T becomes DB. Although the lengths of the bones in the example of FIG. 6B are adjusted so that distance DB is larger than original distance DA, the distance DB may be maintained or decreased, and the degree of the change in the lengths may be adjusted to affect different stretching or contracting motions. For example, the distance of DB may be a linear function, a bilinear function, an exponential function, an inverse function or any combinations of functions of the length adjustment of one or more bones. Alternatively or in addition, the distance DB may be defined as a function that causes a joint (e.g., J2) to follow a certain path with the movement of the body part. The path may include straight line portions and/or curved line portions.

Although FIGS. 6A and 6B illustrate the rotation about the base joint J1 occurring first followed by the stretching of the bones, the sequence is merely for the purpose of explanation. In practice, the operation of FIG. 6B may occur before the operation of FIG. 6A, or both operations may occur simultaneously.

Figure 6C:
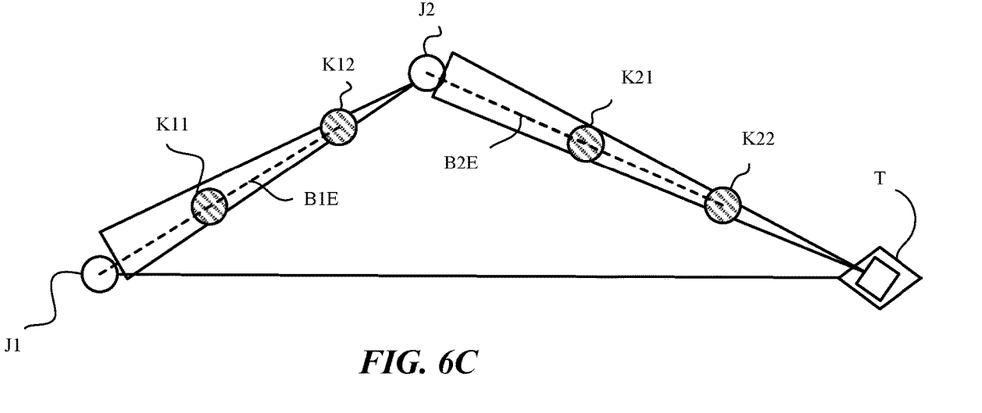
FIG. 6C is a conceptual diagram illustrating first virtual joints associated with base joints, according to one embodiment.

FIG. 6C is a conceptual diagram illustrating first virtual joints K11, K12, K21, K22 associated with base joints J1, J2, according to one embodiment. The first virtual joints K11, K12 are children joints of the base joint J1, and first virtual joints K21, K22 are children joints of the base joint J2, as shown by the dashed lines of FIG. 6C. The interpolator 430 computes the properties (e.g., positions) of the first virtual joints K11, K12 by interpolating corresponding properties of the base joints J1, J2. Similarly, the properties of the first virtual joints K21, K22 are determined by interpolating corresponding properties of the base joint J2 and the hand EE.

Figure 6D:
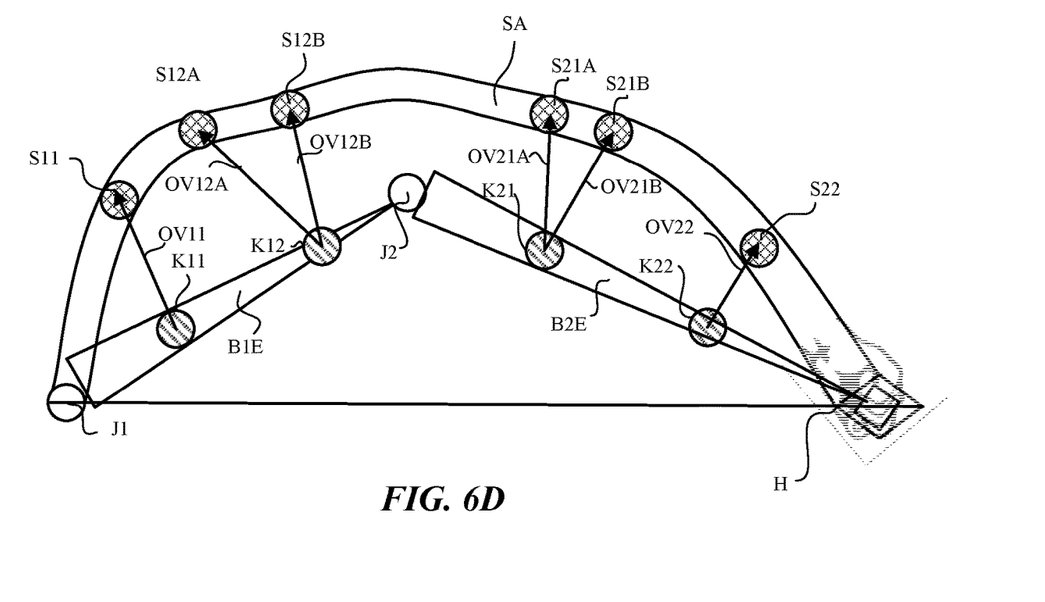
FIG. 6D is a conceptual diagram illustrating second virtual joints offset from the first virtual joints, according to one embodiment.

FIG. 6D is a conceptual diagram illustrating second virtual joints S11, S12A, S12B, S21A, S21B, S22 offset from the first virtual joints K11, K12, K21, K22, according to one embodiment. The second virtual joints S11, S12A, S12B, S21A, S21B, S22 are offset from corresponding first joints K11, K12, K21, K22 by offset vectors OV11, OV12A, OV12B, OV21A, OV21B, OV22, respectively. As illustrated in FIG. 6D, more than one second virtual joints (e.g., S12A, S12B, S21A, S21B) may be associated with a single first virtual joint (e.g., K12, K21), while some first virtual joints (e.g., K11, K22) may be associated with only a single second virtual joint (e.g., S11, S22). The second forward kinematics module 446 computes the second virtual joints information 448 that includes, for example, properties such as positions and orientations of the second virtual joints S11, S12A, S12B, S21A, S21B, S22 by performing forward kinematics on the first virtual joints K11, K12, K21, K22 using the offset vectors OV11, OV12A, OV12B, OV21A, OV21B, OV22.

After the second virtual joints S11, S12A, S12B, S21A, S21B, S22 are determined, a surface of the arm SA may be defined by polygons whose locations and other properties are determined from properties of one or more of the second virtual joints S11, S12A, S12B, S21A, S21B, S22. The vertices of a polygon may be bound to one or more of base joints, first virtual joints and second virtual joints. In one or more embodiments, locations and other properties of the polygons (e.g., triangular meshes) and their vertices are determined and updated by the matrix processor 510 so that the polygons and/or vertices maintain predefined spatial relationships with the second virtual joints S11, S12, S21, S22. For example, the translational movements of a polygon or its vertices are so that the distance from a corresponding second joint is maintained. The operations to determine the properties of the polygons or vertices may be computed using, for example, linear blend skinning method well known in the art.

Although the example of FIGS. 6A through 6D uses an arm with a single base joint J1 between a parent joint J1 and the end effector EE, the same principle of operations may be applied to other body parts of a character with multiple children base joints between an end effector and a parent joint.

Figure 7:
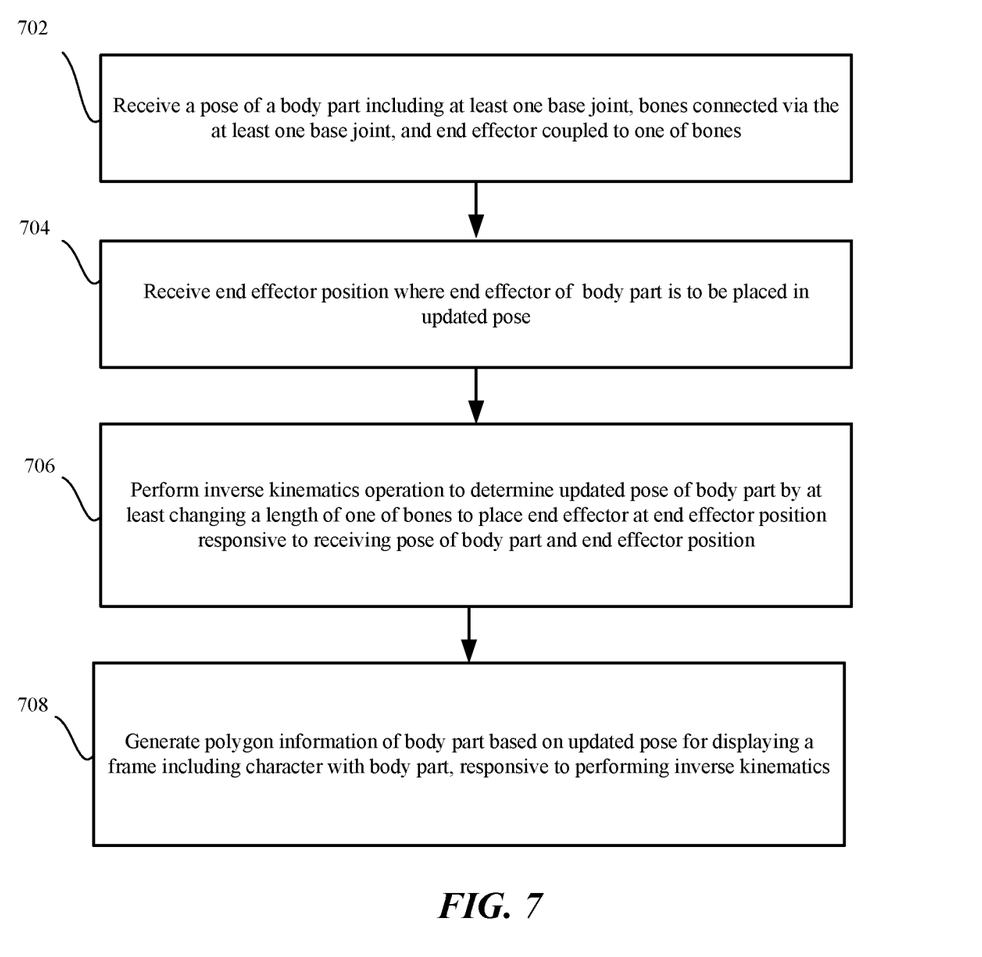
FIG. 7 is a flowchart illustrating a process of simulating a stretchable body part of a character, according to one embodiment.

FIG. 7 is a flowchart illustrating a process of simulating a stretchable body part of a character, according to one embodiment. A pose of body part including at least one base joint, bones connected via the base joint, and an end effector coupled to one of the bones is received 702 at the stretching IK engine 416. The pose may be represented as a collection of properties (e.g., relative translations, rotations and scales of the joints) of base joints, and the lengths of bones connected to the joints. In one or more embodiments, the pose is generated by performing forward kinematics operations as constrained by the character movement information 434.

An end effector position is also received 704 by the stretching IK engine 416. The end effector position is where an end effector connected to one or more bones is to be located as the result of the action. The end effector position may be determined by as a result of operations 312 of the game system 300 that is based on user interactions or other events.

After receiving the pose of the character, the stretching IK engine 416 performs 706, among others, inverse kinematics operations to determine second virtual joints information as an updated pose by at least changing a length of a bone in the character. For example, the base joints information may be obtained by performing the invers kinematics. Then, the first virtual joints information is generated by performing interpolation on base joints information, followed by performing forward kinematics on the first virtual joints to compute the second virtual joints information as the updated pose.

Based on the updated pose as represented by the second virtual joints information, transformation matrices 450 for moving the prior second virtual joints to the updated second prior joints are determined.

After performing the inverse kinematics operation, polygon information of the body parts for rendering the surface of the stretchable/contractable body part for displaying an image frame is generated 708. That is, from the transformation matrices 450, properties of polygons constituting the surface of the body part in an update pose are computed from those of the polygons of the prior pose.

The process of FIG. 7 is merely illustrative. The steps and sequences of FIG. 7 may be modified. For example, the sequence of receiving 702 the pose of the body part and receiving 704 the end effector position may be reversed or may be performed simultaneously. Also, further processes may be performed between the steps illustrated in FIG. 7.

Although the above embodiments are described with respect to simulating a pose of a character in a computer game, the same principle can be applied to other fields such as creating scenes in movies, rendering avatars for communication, emulating real-world interactions of objects with stretchable members such as robots. Such scenes may be stored in a non-transitory computer readable storage medium such as DVD, CDROM or a flash memory drive. Such scenes may also be transmitted over a network for access.

In one or more embodiments, joints information 418 generated from the rigid IK engine 414 is blended with base joints information 422 generated by the stretching IK engine 416 to generate blended joints information using respective weights. The weights may be adjusted for different frames so that smooth transitions are made between the poses generated using joints information 418 and base joints information 422.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method for generating a character in a computer game, comprising:
    receiving a pose of a body part, the body part including at least one base joint, bones connected via the at least one base joint, and an end effector coupled to one of the bones;
    receiving an end effector position where the end effector of the body part is to be placed in an updated pose;
    performing inverse kinematics operation to determine the updated pose of the body part by at least changing a length of one of the bones to place the end effector at the end effector position responsive to receiving the pose of the body part and the end effector position; and
    generating polygon information of the body part based on the updated pose for displaying a display frame including a character with the body part, responsive to performing the inverse kinematics.

2. The method of claim 1, further comprising determining properties of a plurality of first virtual joints that are children joints of the at least one base joint by performing interpolation joint information of two or more base joints.

3. The method of claim 2, further comprising determining properties of a plurality of second virtual joints that are children joints of the first virtual joints by performing forward kinematic operations on the first virtual joints using the pose of the body part, wherein polygons corresponding at least a portion of a surface of the body part are bound to the second virtual joints.

4. The method of claim 3, wherein relationships between a subset of the second joints and an associated first virtual joints are defined by offset vectors.

5. The method of claim 1, further comprising:
    receiving character movement information of the character; and
    performing forward kinematics operations as constrained by the character movement information.

6. The method of claim 1, further comprising:
    receiving an enablement signal indicating enabling of the changing of the length of one of the bones.

7. The method of claim 1, wherein the updated pose indicates at least a translation movement and a rotational movement each of the bones in a matrix form.

8. The method of claim 1, wherein translational movements of two or more of the bones are changed by the inverse kinematics operation.

9. The method of claim 1, performing the inverse kinematics operation comprises:
   rotating a first bone relative to a first joint to move a second bone and a second joint between the first bone and the second bone so that the end effector is placed on a straight line between the first joint and the end effector position; and
   extending or contracting the first bone and extending or contracting the second bone so that a distance between the second joint and the straight line satisfies a predetermined condition and the end effector is placed at the end effector position.

10. A non-transitory computer-readable storage medium storing instructions thereon, the instructions when executed by one or more processors cause the one or more processors to:
   receive a pose of a body part, the body part including at least one base joint, bones connected via the at least one base joint, and an end effector coupled to one of the bones;
   receive an end effector position where the end effector of the body part is to be placed in an updated pose;
   perform inverse kinematics operation to determine the updated pose of the body part by at least changing a length of one of the bones to place the end effector at the end effector position responsive to receiving the pose of the body part and the end effector position; and
   generate polygon information of the body part based on the updated pose for displaying a display frame including a character with the body part, responsive to performing the inverse kinematics.

11. The computer-readable storage medium of claim 10, further comprising instructions that cause the one or more processors to:
   determine properties of a plurality of first virtual joints that are children joints of the at least one base joint by performing interpolation joint information of two or more base joints.

12. The computer-readable storage medium of claim 11, further comprising instructions that cause the one or more processors to:
   determine properties of a plurality of second virtual joints that are children joints of the first virtual joints by performing forward kinematic operations on the first virtual joints using the pose of the body part, wherein polygons corresponding at least a portion of a surface of the body part are bound to the second virtual joints.

13. The computer-readable storage medium of claim 12, wherein relationships between a subset of the second joints and an associated first virtual joints are defined by offset vectors.

14. The computer-readable storage medium of claim 11, further comprising instructions that cause the one or more processors to:
   receive character movement information of the character; and
   perform forward kinematics operations as constrained by the character movement information.

15. The computer-readable storage medium of claim 10, further comprising instructions that cause the one or more processors to:
   receive an enablement signal indicating enabling of the changing of the length of one of the bones.

16. The computer-readable storage medium of claim 10, wherein the updated pose indicates at least a translational movement and a rotational movement of each of the bones in a matrix form.

17. The computer-readable storage medium of claim 10, wherein translational movements of two or more of the bones are changed by the inverse kinematics operation.

18. The computer-readable storage medium of claim 10, wherein instructions to perform the inverse kinematics operation comprises instructions to:
   rotate a first bone relative to a first joint to move a second bone and a second joint between the first bone and the second bone so that the end effector is placed on a straight line between the first joint and the end effector position; and
   extend or contracting the first bone and extending or contracting the second bone so that a distance between the second joint and the straight line satisfies a predetermined condition and the end effector is placed at the end effector position.

19. A non-transitory computer-readable storage medium storing a series of image frames generated by:
   receiving a pose of a body part, the body part including at least one base joint, bones connected via the at least one base joint, and an end effector coupled to one of the bones;
   receiving an end effector position where the end effector of the body part is to be placed in an updated pose;
   performing inverse kinematics operation to determine the updated pose of the body part by at least changing a length of one of the bones to place the end effector at the end effector position responsive to receiving the pose of the body part and the end effector position; and
   generating polygon information of the body part based on the updated pose for displaying a display frame including a character with the body part, responsive to performing the inverse kinematics.

20. The computer-readable storage medium of claim 19, wherein the image frames are generated further by:
   determining properties of a plurality of first virtual joints that are children joints of the at least one base joint by performing interpolation joint information of two or more base joints, and
   determining properties of a plurality of second virtual joints that are children joints of the first virtual joints by performing forward kinematic operations on the first virtual joints using the pose of the body part, wherein polygons corresponding at least a portion of a surface of the body part are bound to the second virtual joints.

* * * * *